Figure 1:
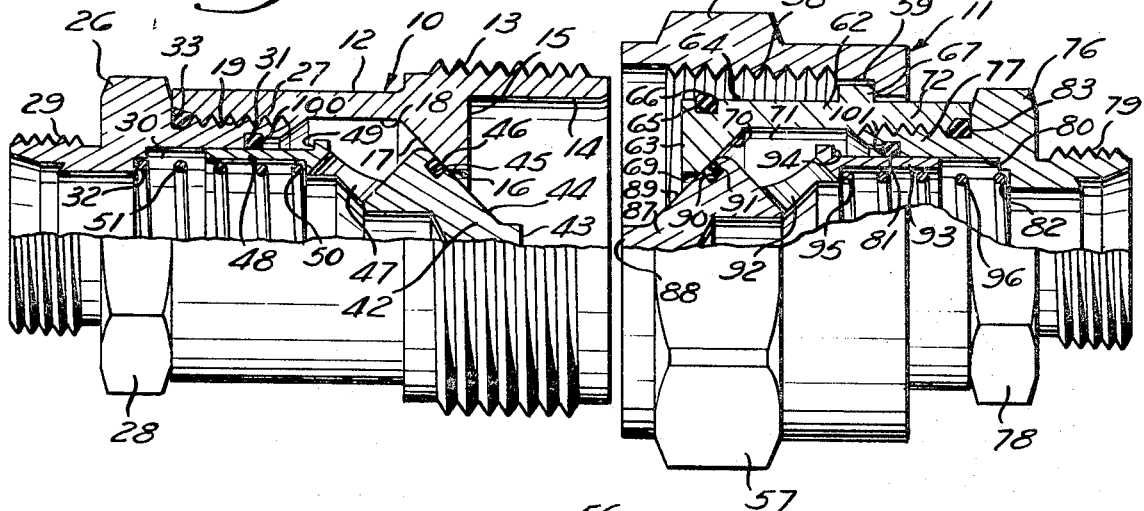

United States Patent

[11] 3,525,361

| [72] | Inventors | William G. Cerbin |
| | | Willowick, Ohio; |
| | | James R. Jeromson, Jr., Willoughby, Ohio |
| [21] | Appl. No. | 689,360 |
| [22] | Filed | Dec. 11, 1967 |
| [45] | Patented | Aug. 25, 1970 |
| [73] | Assignee | The Weatherhead Company |
| | | Cleveland, Ohio |
| | | a corporation of Ohio |

[54] QUICK DISCONNECT COUPLING
4 Claims, 2 Drawing Figs.

[52] U.S. Cl. .................................................. 137/614.04
[51] Int. Cl. ................................................... F16 29/00
[50] Field of Search ................................. 137/614.02,
614.03, 614.04, 614.05; 251/149.1, 149.5, 149.6, 368

[56] References Cited
UNITED STATES PATENTS

| 626,778 | 6/1899 | Tanney | 137/614.04 |
| 2,322,449 | 6/1943 | Johnson | 137/614.04 |
| 2,453,741 | 11/1948 | Bopp | 137/614.04 |
| 2,614,866 | 10/1952 | Ulrich | 137/614.04 |
| 2,646,994 | 7/1953 | Scheiwer | 137/614.03 |
| 2,208,286 | 7/1940 | Berger | 137/614.03 |
| 2,254,997 | 9/1941 | Fisher | 137/614.03 |
| 2,461,705 | 2/1949 | Stranberg | 137/614.04 |
| 3,137,476 | 6/1964 | Rotheraine | 251/368 |
| 3,211,178 | 10/1965 | Kiszko | 137/614.04 |

Primary Examiner— William F. O'Dea
Assistant Examiner— Howard M. Cohn
Attorney—Mc Nenny, Farrington, Pearne and Gordon ABSTRACT: A valved fluid coupling in which each member has an axially sliding poppet. These poppets engage each other to open when the coupling members are connected together. When open, the axially sliding poppets force each other against resilient elastic stops which positively restrain the poppets against further axial movement.

Patented Aug. 25, 1970

3,525,361

INVENTORS
WILLIAM G. CERBIN,
& JAMES R. JEROMSON JR.
BY
McNENNY, FARRINGTON, PEARNE & GORDON

ATTORNEYS 3,525,361

QUICK DISCONNECT COUPLING

This invention relates generally to separable fluid couplings and more particularly to separable valved fluid couplings in which the valve members are opened automatically by axial movement when the couplings are connected.

Separable fluid couplings are widely used for interconnecting conduits, and in many such applications it is necessary to provide a fluid coupling which when disconnected prevents the escape of fluid through the disconnected coupling members. Such couplings are generally provided with a spring biased check valve poppet in each coupling member so that when the coupling members are disconnected the fluid flow therethrough is terminated. When such coupling members are connected together, the check valve members are axially displaced against one another so as to permit the passage of fluid through the coupling.

When the poppets are in the open position and located only by the biasing spring, they tend to form an oscillating system so that variations in fluid flow and the pressure drop across the poppets may in some systems cause the poppets to oscillate as a unit which may result in excessive mechanical wear and induce undesirable fluctuations in the fluid flow. With the present invention, the poppets are positively restrained against such axial movement when in the open position so that oscillation is effectively prevented regardless of the magnitude of the fluctuations of fluid flow and pressure drop against the poppets.

It is therefore the principal object of this invention to provide a novel elastic stop for axially supporting the open check valves in a separable valved fluid coupling.

It is another object of this invention to provide a novel elastic stop as set forth in the principal object comprising a high rate elastic annular ring which is of compact size and simple construction.

The foregoing and other objects and advantages of this invention are accomplished in the preferred embodiment of the invention which utilizes a tubular male member telescopically connected to a tubular female member. Both of said members incorporate check valve poppets which open automatically to allow the flow of fluid when said members are coupled together.

A high rate elastic stop in the form of an O-ring is provided in each member to engage and limit axial movement of the check valve poppets when the coupling members are connected and the check valves axially displaced to the fully open position to allow the passage of fluid through the coupling.

Figure 2:
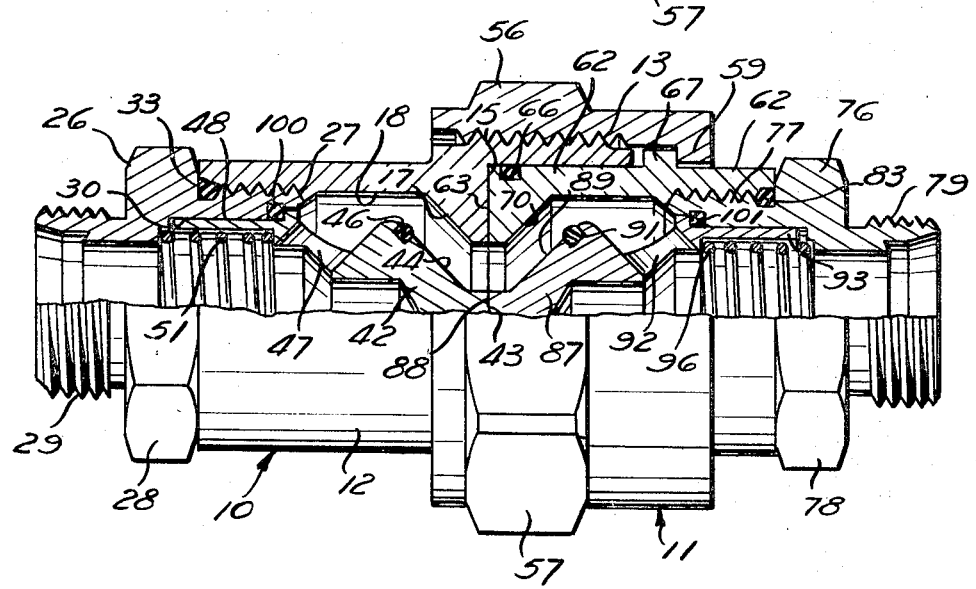

Further objects and advantages of this invention will readily become apparent to those skilled in the art upon comprehension of the preferred embodiment of the invention as shown in the drawings and described in the accompanying detailed description. In the drawings:

FIG. 1 is a side elevation partly in cross section of a coupling according to the preferred embodiment of the invention showing the male and female members in the uncoupled position; and FIG. 2 is a side elevation partly in cross section of the coupling of FIG. 1 showing the members in the coupled position.

Referring now to the drawings in greater detail, FIG. 1 shows a valved fluid coupling comprising a tubular male member 10 and a tubular female member 11.

The male member 10 incorporates a generally tubular body 12 having at the right end an externally threaded end portion 13. The remaining exterior portion of body 12 is generally tubular and of substantially uniform size. An internal axial bore 14 extends from the right end through body 12 to an internal radial wall surface 15. Proceeding further through the interior of body 12 from the right end to the left end, a generally cylindrical axial passage 16 extends a short distance from the radial wall surface 15 to a generally conical surface 17. The conical surface 17 increases in diameter until a generally cylindrical axial passage 18 is reached. Axial passage 18 extends from conical surface 17 to an internally threaded end portion 19 at the left end of body 12.

A substantially tubular plug member 26 is furnished with an externally threaded end portion 27 at the right end which screws into the internally threaded left end portion 19 of body 12. Proceeding from the right end to the left end of the tubular plug member 26, the externally threaded end portion 27 terminates at an external polygonal flange 28 which accommodates a tool used to tighten said plug member 26 into said body 12. The flange 28 extends to an externally threaded left end portion 29 which accepts a fitting attached to the conduit that is to be coupled. The interior of tubular plug member 26 is provided with a generally cylindrical passage 30 therethrough having two shoulders 31 and 32 located at the right end and middle of said cylindrical passage respectively. An annular seal 33 is provided to prevent leakage between body 12 and plug member 26.

The male member 10 is also provided with a check valve structure to automatically terminate the flow of fluid when the coupling members are disconnected. The check valve structure comprises a check valve poppet 42 which is provided with a radial end surface 43 on the right end. Proceeding to the left, the radial end surface 43 extends to a conical element 44 having an external peripheral groove 45 in which annular seal 46 is located. When the coupling members are disconnected and the check valve is closed, conical element 44 and seal 46 bear against conical surface 17 of body 12 to terminate the flow of fluid through the male member. The conical element 44 extends to a plurality of oblique passages 47 through which the fluid flows when the coupling members are connected. The oblique passages 47 terminate in a generally tubular sliding portion 48 which fits snugly and moves axially within passage 30 of plug member 26. The sliding portion 48 is provided with an external flange or shoulder 49 and an internal shoulder 50. Coil spring 51 is axially located within the axial passage 30 of plug member 26 such that its left end bears against shoulder 32 of plug member 26, and its right end bears against internal shoulder 50 of check valve poppet 42 to bias check valve poppet 42 to the right in the closed position when the coupling members are disconnected.

The female member 11 is provided with a generally cylindrical connector nut 56 having an external polygonal flange 57 to accommodate a tool used to tighten the male member 10 and the female member 11 together. The flange 57 surrounds an internally threaded left end portion 58 which is screwed onto the externally threaded right end portion 13 of the male body 12 when the coupling is connected. The internally threaded left end portion 58 extends to and terminates at the right end in an inwardly extending flange 59.

The generally tubular connector nut 56 surrounds a generally tubular female body 62. The body 62 has a radial end wall surface 63 at its left end and a generally tubular external surface 64 having an external peripheral groove 65 at the left end in which a suitable seal such as O-ring 66 is located. The generally tubular external surface 64 is also provided with an external shoulder or flange 67 located to the right of the external peripheral groove 65. When the coupling members are connected, the right end flange 59 of connector nut 56 bears against external flange 67 of body 62, holding the body in such position that radial left end wall surface 63 of female body 62 contacts radial wall surface 15 of male body 12. In this position the tubular external surface 64 and the annular seal 66 of body 62 snugly fit within the axial bore 14 of body 12. The tubular body 62 is also provided with an axial passage therethrough similar to that of body 12 of the male member. At the left end of the interior of the body 62, a short axial bore 69 extends to a flaring conical surface 70 which terminates at an axial passage 71. Axial passage 71 extends to the internally threaded right end portion 72 into which tubular plug member 76 is screwed.

Tubular plug member 76 of the female member is similar to plug member 26 of the male member. The plug member 76 comprises an externally threaded left end portion 77 extending to an external polygonal flange 78, and an externally threaded right end portion 79 which will accept a fitting attached to the conduit that is to be connected. The plug member 76 is provided with a generally cylindrical axial passage 80 therethrough which is provided with two shoulders 81 and 82 located at the left end and middle of the axial passage 80 respectively. An annular seal 83 is provided to prevent leakage between body 62 and plug member 76.

Female member 11 is further provided with a check valve structure similar to that incorporated in male member 10. This check valve structure comprises a check valve poppet 87 provided with a radial end surface 88 at the left end and a conical element 89 having an external peripheral groove 90 in which annular O-ring seal 91 is located. Proceeding toward the right end of poppet 87, conical element 89 extends to a plurality of oblique passages 92. The oblique passages 92 extend to a generally tubular sliding portion 93 having an external shoulder 94 and an internal shoulder 95. A coil spring 96 is axially positioned within passage 80 of plug member 76 with its right end bearing against the internal shoulder 82 of the plug member 76. The left end of spring 96 bears against the internal shoulder 95 of the check valve poppet 87 in order to bias said poppet 87 to the left in a closed position when the coupling members are disconnected.

Referring now to FIG. 2, when the coupling members are in the coupled poistion, the right end surface 43 of the male check valve poppet 42 contacts the left end surface 88 of female check valve poppet 87. The two check valve poppets then axially displace each other so that they are both in the open position. With the coupling thus connected, assuming a fluid pressure gradient which is higher at the male end of the coupling, the fluid is free to flow into passage 30 of male plug member 26, through the oblique passages 47 of the male check valve poppet 42, through the passage created between conical surface 44 and conical surface 17, and into and through a similar route through the female member.

When the two coupling members are connected together, as shown in FIG. 2, with faces 15 and 63 in contact, the poppets 42 and 87 are then in the fully opened position against the biasing force of the springs 51 and 96. The poppets, if not restrained, could move a further distance in the opening direction, so that the poppets could tend to oscillate axially as a unit with fluid pressure pulsations. This continued movement would tend to cause rapid wear at the sliding bearing between the poppets and the plug members 26 and 76 in which they are journaled and supported. This problem is overcome in the present invention by providing a high rate resilient elastic stop for each of the poppet members, so that when they are in the fully opened position, they are restrained against further opening movement. This is accomplished according to the preferred embodiment of the invention by providing annular stop members 100 and 101 adjacent to the shoulders 31 and 81 in the plug members 26 and 76, respectively. These annular stop members may be made of any suitable material, and where relatively low pressures and forces are involved, may be in the form of an elastomeric O-ring which is engaged by one of the shoulders 49 and 94, respectively. Thus, when the poppets are fully opened, the shoulders engage and resiliently compress the O-rings or annular stop members to a sufficient extent that the poppets are unable to oscillate or vibrate any appreciable amount. Thus, the axial movement of the poppet is prevented and the possibility of excessive wear is eliminated.

By providing a stop with a moderate amount of compressibility, it is possible to easily accommodate the various production tolerances in the couplings to insure sufficient clamping of the two poppets even though there may be some variation of the compression because of variable tolerances in the coupling. It is also understood that more rigid materials such as nylon or the like may be used, and under some circumstances, a metallic spring wave washer may also be used, but it is recognized that the presence of an elastomeric material having a certain amount of damping will more positively prevent even incipient oscillation taking place.

Although in the embodiment shown, a resilient stop has been provided in each coupling member for the respective poppet, it is understood that in other arrangements of couplings, where there is flow only in one direction, it may be possible to obtain sufficient control over the poppet motion by providing a stop in only one member, and such a stop may be utilized also in couplings having different spring rates to control the order in which poppet opening takes place by allowing one poppet to open fully against a stop against a relatively weak spring before the other poppet is opened against the biasing force of a relatively strong spring.

Although the preferred embodiment of the invention has been shown and described in detail, it is recognized that various modifications and re-arrangements will readily occur to those skilled in the art, upon full comprehension of the invention, and may be resorted to without departing from the scope of the invention as defined in the claims.

We claim:

1. A separable valved fluid coupling assembly comprising first and second coupling members, connecting means for holding both said coupling members in coupled engagement, said first member having passage means therethrough, first valve means in said first member passage means axially movable between open and closed positions, first spring means operable to bias said first valve means toward the closed position, said second member having passage means therethrough in fluid communication with said first member passage means when said coupling members are engaged, second valve means in said second member passage means axially movable between open and closed positions, second spring means operable to bias said second valve means toward the closed position, displacement means operable to axially displace said first valve means against said first spring means and said second valve means against said second spring means when said members are in coupled engagement, first elastomeric resilient stop means in said first member axially engageable and axially compressible by said first valve means, second elastomeric resilient stop means in said second member axially engageable and axially compressible by said second valve means, said first and second resilient stop means being axially engaged and axially compressed by the respective valve means in the open position when said members are in coupled engagement to axially compress said resilient stop means to resiliently restrain said first and second valve means as a unit against further axial movement with respect to said coupling members.

2. A coupling assembly as set forth in claim 1 wherein both said stop members are annular members surrounding their respective passage means.

3. A separable valved fluid coupling assembly comprising a generally tubular first member, a generally tubular second member, engagement means for telescopically interlocking an interlocking end of said first member with an interlocking end of said second member in coupled engagement, said first member incorporating a first passage means therethrough, a first valve seat substantially adjacent the interlocking end of said first passage means, a first poppet means slidably guided in said first passage means and axially movable to make sealing engagement with said first valve seat, first spring means operable to bias said first poppet against said first valve seat, said second member incorporating a second passage means therethrough fluidly communicable with said first passage means, a second valve seat substantially adjacent the interlocking end of said second passage means, a second poppet means slidably guided in said second passage means and axially movable to make sealing engagement with said second valve seat, second spring means operable to bias said second poppet against said second valve seat, means operable to engage said first poppet means with said second poppet means to axially displace said first poppet means against said first spring means through a first predetermined axial distance and said second poppet means against said second spring means through a second predetermined axial distance when said members are telescopically interlocked, first resilient elastomeric stop means mounted on said first member and having an end face operable to be axially engaged by an abutment shoulder of said first poppet means when said first poppet means is displaced through said first predetermined axial distance, a second resilient elastomeric stop means mounted on said second member and having an end face operable to be axially engaged by an abutment shoulder of said second poppet means when said second poppet means is displaced through said second predetermined axial distance, said first and second resilient stop means being axially compressed and cooperating to effectively resiliently restrain said engaged first and second poppet means from further axial movement in either direction with respect to said coupling members when said members are in coupled engagement.

4. A coupling assembly as set forth in claim 3 wherein both said stop means are annular members surrounding the respective passage means.